(12) United States Patent
Phillips et al.

(10) Patent No.: US 9,152,377 B2
(45) Date of Patent: Oct. 6, 2015

(54) DYNAMIC EVENT SOUNDS

(71) Applicant: THOMSON LICENSING, Issy de Moulineaux (FR)

(72) Inventors: Sheldon George Phillips, Glendale, CA (US); Ryan Cameron Coulter, Portland, OR (US); Michael Etter, Portland, OR (US); Rodrigo Thomas Moyses, Portland, OR (US); Greg Alan Martin, Portland, OR (US); John Vieira, Portland, OR (US)

(73) Assignee: Thomson Licensing, Issy les Moulineaux (FR)

( * ) Notice: Subject to any disclaimer, the term of this patent is extended or adjusted under 35 U.S.C. 154(b) by 79 days.

(21) Appl. No.: 14/013,610

(22) Filed: Aug. 29, 2013

(65) Prior Publication Data

US 2015/0061845 A1  Mar. 5, 2015

(51) Int. Cl.
*G08B 5/22* (2006.01)
*G06F 3/16* (2006.01)
*G08B 3/10* (2006.01)

(52) U.S. Cl.
CPC .. *G06F 3/167* (2013.01); *G08B 3/10* (2013.01)

(58) Field of Classification Search
None
See application file for complete search history.

(56) References Cited

U.S. PATENT DOCUMENTS

| | | | |
|---|---|---|---|
| 6,163,510 A * | 12/2000 | Lee et al. | 386/281 |
| 7,391,300 B2 * | 6/2008 | Inkinen | 340/384.1 |
| 7,515,980 B2 | 4/2009 | Watanabe | |
| 7,750,227 B2 | 7/2010 | Hayes et al. | |
| 7,769,811 B2 | 8/2010 | Heikes et al. | |
| 7,924,996 B2 | 4/2011 | Appelman et al. | |
| 8,055,248 B2 * | 11/2011 | Hicks, III | 455/417 |
| 2003/0156700 A1 * | 8/2003 | Brown et al. | 379/210.02 |
| 2004/0198471 A1 * | 10/2004 | Deeds | 455/575.1 |
| 2004/0264653 A1 * | 12/2004 | Revisky et al. | 379/88.12 |
| 2007/0099638 A1 * | 5/2007 | Voltz | 455/500 |
| 2008/0151786 A1 * | 6/2008 | Li et al. | 370/276 |
| 2009/0117922 A1 * | 5/2009 | Bell et al. | 455/466 |
| 2009/0190742 A1 * | 7/2009 | Freeman et al. | 379/265.09 |
| 2009/0191921 A1 * | 7/2009 | Manatrey | 455/567 |
| 2009/0240497 A1 * | 9/2009 | Usher et al. | 704/235 |
| 2010/0052877 A1 * | 3/2010 | Mori | 340/384.5 |
| 2011/0050460 A1 * | 3/2011 | Bruns et al. | 340/905 |
| 2012/0149342 A1 * | 6/2012 | Cohen et al. | 455/412.2 |

* cited by examiner

*Primary Examiner* — Julie Lieu
(74) *Attorney, Agent, or Firm* — Robert D. Shedd

(57) ABSTRACT

Event sounds for a multimedia system are assigned statically and/or dynamically to an event based on internal and/or external events and the like. An associator associates a sound to an event based on these factors. User related information that is implicit and/or explicit can also be used to determine an association between an event sound and an event. A controller controls which sound is played back when a particular event occurs based on the event sound association. Probabilities related to a user's preferences can also be utilized to determine which sound is played back during an occurrence of an event.

11 Claims, 3 Drawing Sheets

DYNAMIC EVENT SOUNDS

BACKGROUND

Devices in use today utilize sounds or sound bites to indicate when an event takes place. Most people are familiar with error sounds that beep or buzz at them when they enter incorrect data or select an invalid choice. Computers often use these sounds to communicate notices and acceptances of various actions. This gives a user feedback as to whether they properly entered something. Overtime, users often tire of the same sounds indicating the same events. Devices then began allowing users to select different sound sets based on a theme (e.g., wild west, animal calls, etc.) and some even allow the user to customize their own sound set. However, a user is still stuck with a given sound for a given event. In other words, a user can change a sound for a given event, but that sound does not change for that event until a user selects another sound set.

SUMMARY

Audible events for multimedia systems have sounds associated with them that can change based on different criteria. The event sound criteria can be weighted to further refine which sound is associated with an audible event. This allows the event sound to change automatically rather than have a user select a given set of event sounds each time they want a change. Since the criteria can be changed as well, the conditions for selecting a particular sound for an event can change. This is particularly valuable when, for example, environmental changes occur and the like (e.g., event sound can change to a louder or more commanding sound when the ambient sound level increases, etc.). The sounds can also change based on timing, events, user actions and/or other external events.

The above presents a simplified summary of the subject matter in order to provide a basic understanding of some aspects of subject matter embodiments. This summary is not an extensive overview of the subject matter. It is not intended to identify key/critical elements of the embodiments or to delineate the scope of the subject matter. Its sole purpose is to present some concepts of the subject matter in a simplified form as a prelude to the more detailed description that is presented later.

To the accomplishment of the foregoing and related ends, certain illustrative aspects of embodiments are described herein in connection with the following description and the annexed drawings. These aspects are indicative, however, of but a few of the various ways in which the principles of the subject matter can be employed, and the subject matter is intended to include all such aspects and their equivalents. Other advantages and novel features of the subject matter can become apparent from the following detailed description when considered in conjunction with the drawings.

DETAILED DESCRIPTION

Figure 1:
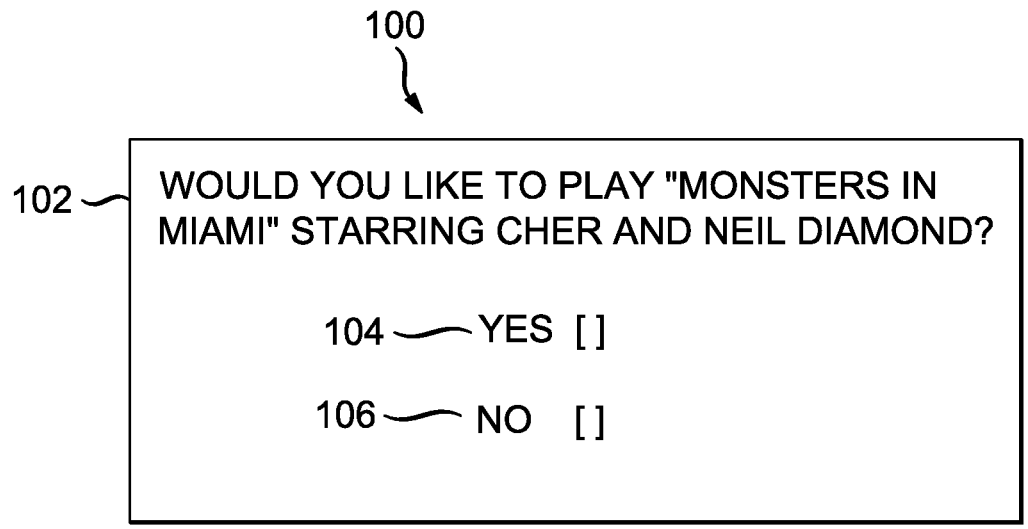
FIG. 1 is an example of a user interface that a user can use to interact with a multimedia system.

The subject matter is now described with reference to the drawings, wherein like reference numerals are used to refer to like elements throughout. In the following description, for purposes of explanation, numerous specific details are set forth in order to provide a thorough understanding of the subject matter. It can be evident, however, that subject matter embodiments can be practiced without these specific details. In other instances, well-known structures and devices are shown in block diagram form in order to facilitate describing the embodiments.

Techniques are provided that allow a user to be presented with different sound effects when operating a multimedia system. Multimedia systems include, but are not limited to, desktop devices, mobile devices, televisions and/or other devices such as those that provide for playback and/or recording of audio and video media. Typically, when a user activates a function while using such a multimedia system—such as, for example, asking that a video program be recorded or scrolling through a program electronic guide, the outputting of a sound can follow the operation of such actions. For example, a scrolling operation can have an audible "beep" sound whenever a user operates an arrow key on a remote control or other type of input device. This allows users to be presented with different sounds for the same actions based on a variety of criteria.

In one example, a multimedia system presents a user with a set of default sounds whenever the user applies an action. For discussion purposes, a simple example is illustrated where a user is presented with three different actions for operating a user interface. Each of these actions produces a corresponding default sound. FIG. 1 shows an example 100 user interface 102 that a user can use to interact with a multimedia system. The user interface 102 presents a user with options 104, 106 for playing back a recorded video program called "Monsters in Miami" where "Yes" 104 can be selected to playback the program, while "No" 106 is selected when playback is not desired. If a user operates a different area on the user interface 102, an error message is shown.

Figure 2:
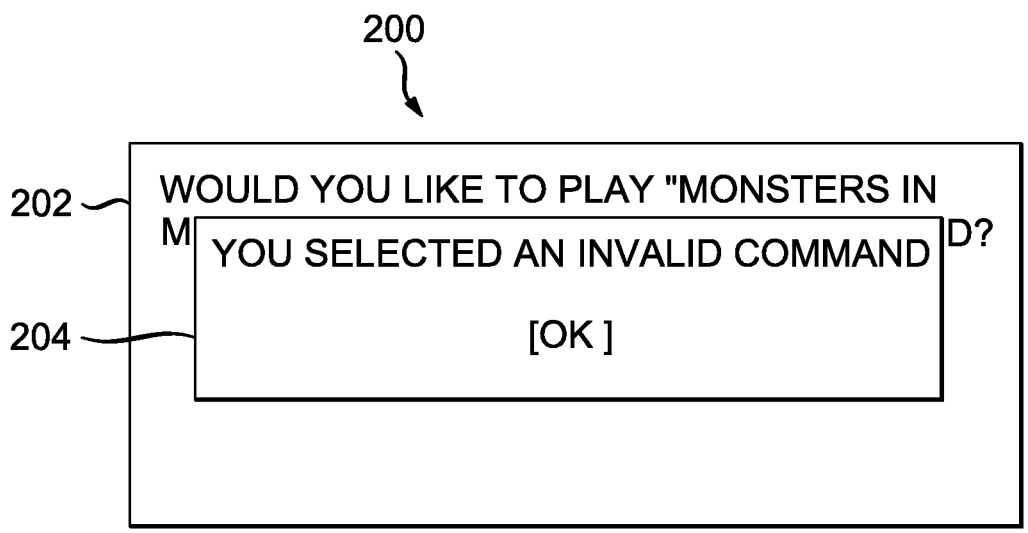
FIG. 2 is an example of a user interface in which a user has operated the user interface incorrectly.

FIG. 2 is an example 200 that depicts a user interface 202 in which a user has operated the user interface 202 incorrectly. An error 204 is displayed on the user interface 202 subsequent to the user's invalid operation. Hence, with these three conditions (Yes 104, No 106, and Error 204), a set of default sounds can be designated for each condition. In this example, such default sounds are labeled "GlobalSound" where the Yes 104 is associated with "GlobalSound_1," No 106 is associated with "GlobalSound_2," and "GlobalSound_3" is associated with error 204. Such sounds can be encoded using, for example, WAV, MP3, AAC, AIFF, WMA, ATRAC and/or MPEG-4, and the like.

Instead of having such sound designations be static, different sets of sounds and/or individual sounds can be used to replace the default sounds associated with GlobalSound and corresponding commands. For example, various sets of sounds can be automatically selected in relationship to a user's profile, where the multimedia system automatically selects a sound and/or sound set based on corresponding attributes in a profile. Profiles can be generated from a combination of explicit and/or implicit information. For example, a user can designate certain choices for their profile and/or the user's selections in, for example, recording and/or playing back certain media can be used for user profile generation.

In one example, if a user profile indicates that a user likes sports, a series of sounds with a sports theme (e.g., a crowd cheering for a "Yes" command, a crowd booing for a "No" command and a crowd sighing for a "error" condition). This can be contrasted against sounds that are selected if it is determined that a user likes movies (e.g., a sound of Sally Field saying "You like me" for a "Yes," a "Oh No" from Mr.

Bill when a "No" command is used and "It can only be attributable to human error" from 2001 when an "error" command is used). When such sounds are related to a user's profile, they can be designated as "LocalSound."

A third set of sounds can be selected based on media that a user is selecting, for example, for recording and/or playback. These series of sounds can be designated with a "Media-Sound" label. That is, for each piece of media, a mapping to a particular set of sounds can be automatically performed for linking a particular action to a specific sound. Hence, the media "Monsters in Miami" can have a werewolf howl for a "Yes," a Frankenstein growl for "No," and a person screaming if the "Error" command issued. From the different commands, a sample list of sound files can be correlated as shown in TABLE 1. It is expected that a new piece of media can have other sounds associated with it. Hence, a television show or a movie selection can have a different set of sounds than that listed for "Monsters in Miami" in accordance with the techniques described herein.

TABLE 1

|  | Default | Sports Fan | Movie Fan | Media Sounds |
|---|---|---|---|---|
| "Yes" | GlobalSound_1 | LocalSound_S1 | LocalSound_M1 | MediaSound_MIM1 |
| "No" | GlobalSound_2 | LocalSound_S2 | LocalSound_M2 | MediaSound_MIM2 |
| "Error" | GlobalSound_3 | LocalSound_S3 | LocalSound_M3 | MediaSound_MIM3 |

In one example, in the playback of such sounds, one can designate that a sound set such as "Default" or "SportsFan" can be selected where the sounds are played after an event. This result may not be desirable in that a user can find that even though a set of sounds can be automatically selected depending on attributes of a user and/or the media selected, a user may not want to hear all of the same sounds all of the time. Thus, a probability function P can be used to give sounds different weights for when they are played where the value selected is a number from 0 to 1, where the summed P values can be equal to 1.

For example, if it is determined that a user likes to have various sounds mixed up, a system can assign various probabilities to the system sets depending on a user's preferences and/or, for example, media selected. In one scenario, a user is identified as being a sports fan but not a movie fan. Hence, the following probabilities can be assigned to the respective sound sets:

$P_{default}=0.3$ $P_{sportsfan}=0.5$ $P_{moviefan}=0.0$ $P_{mediasounds}=0.2$

That is, using such weights, there is a 30% chance that the sound from a Default set is selected, a 50% chance that SportsFan sounds are selected, a 20% chance that a Media-Sound set of sounds are selected and a 0% chance that MovieFan sounds are selected. The probabilities can be adjusted based on, for example, when a user's profile changes and/or a change in media and the like. For example, if a sports fan selects media that is sports related, the $P_{mediasounds}$ probability can go up while $P_{sportsfan}$'s probability goes down. Other aspects of such changes in probabilities can be used in accordance with these techniques.

Special sets of sounds can optionally be used where they are based on a particular time (e.g., day of week, release day for new content, and the like). Such sounds can be automatically played back instead of using a typical set of sounds as described above. For example, if a new movie is coming on in a couple of days, the sound set can be swapped out to play sounds corresponding to the new movie depending, for example, on user operator assignment and/or a user's preferences. In one scenario, a probability for such a sound set can be set to a value of 1.0 or such sounds can be added to various sets of sounds in accordance with the techniques described above.

Figure 3:
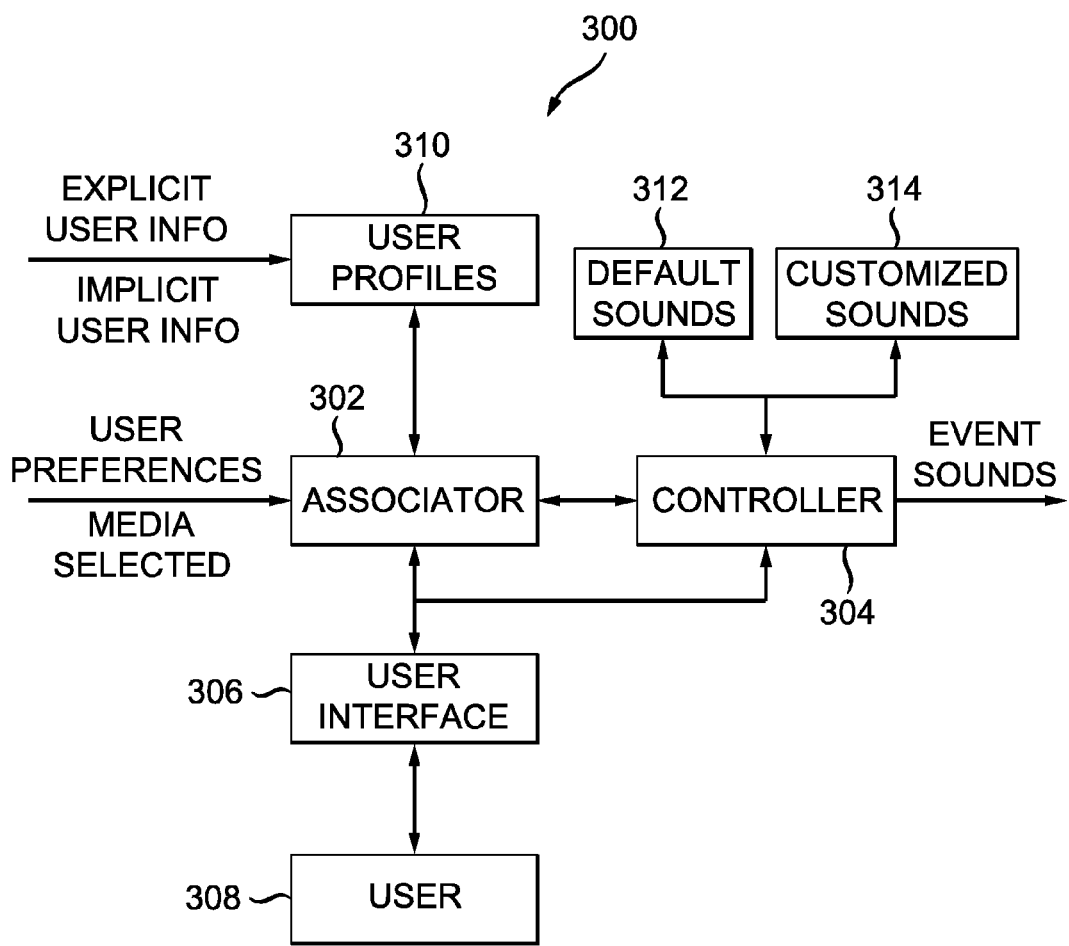
FIG. 3 is an example of a multimedia system that includes a sound associator and a sound controller.

An example of a multimedia system 300 that includes an associator 302 that associates sounds to events and a controller 304 that controls which sound is played when an event occurs is shown in FIG. 3. The associator 302 uses various sources of information to facilitate it in associating a sound to a given event. This can include, but is not limited to, information from a user interface 306 and the like. This can include directly entered information in the user interface 306 by a user 308 and/or inferred information based on a user's selections and the like. The user interface 306 can also be used to determine which user is using the multimedia system 300. Thus, the associator 302 can use information such as, for example, user preferences, types of media selected, content of media selected and/or user profiles 310 and the like. The user profiles 310 can contain explicit and/or implicit user information and the like. That is, a user profile can contain information directly entered by a user and/or information gained from watching and learning how a user interacts with the multimedia system 300 and the like. Profiles can be obtained through networks and also shared among different multimedia systems. For example, preferences and viewing habits set up on a television can be transferred to a mobile device such as a tablet and/or smart cell phone and the like.

The associator 302 can use the information to associate or link a sound to a given event related to the multimedia system 300. The association can be a direct or solid link (e.g., an error gives a dog bark, etc.). The association can also be a weight value or likelihood that a particular user desires to hear that sound. Thus, the dog bark sound can be given a very low weighting if the associator 302 determines that the user does not like dogs. In a similar fashion, cat sounds can be given a greater weighting if the associator 302 determines that the user likes cats instead. If changes occur, the associator can alter associations and weightings. Thus, for example, if a user changes and/or a user changes multimedia systems, the associator can update its associations and/or weightings to reflect those changes. The associator 302 then passes the associations and/or weightings to the controller 304. Since the associator 302 can operate in a dynamic capacity, it can push changes to the controller 304 and/or wait for the controller 304 to request updates.

The controller 304 determines which sound is played/outputted when an event occurs related to the multimedia system 300. The controller 304 can have access to storage locations containing default sounds 312 and/or customized sounds 314 and the like. This allows it to select and output a preferred sound when an event occurs. The controller 304 takes into account the association and/or a weighting when determining which sound to select for playback. The controller 304 can receive input from the user interface 306 to facilitate in its decision. This can include, but is not limited to, user identification and/or user preferences/feedback and the like. Thus, a user can switch sound sets and the like and the controller 304 will alter its sound control accordingly. In a similar fashion, the controller 304 can use external information such as, for example, environmental information in controlling an event sound. For example, a simple beep can be used when the multimedia system 300 is in a quiet environment. The beep can be changed to a loud scream when the controller 304 detects that the environment noise level has drastically increased.

Figure 4:
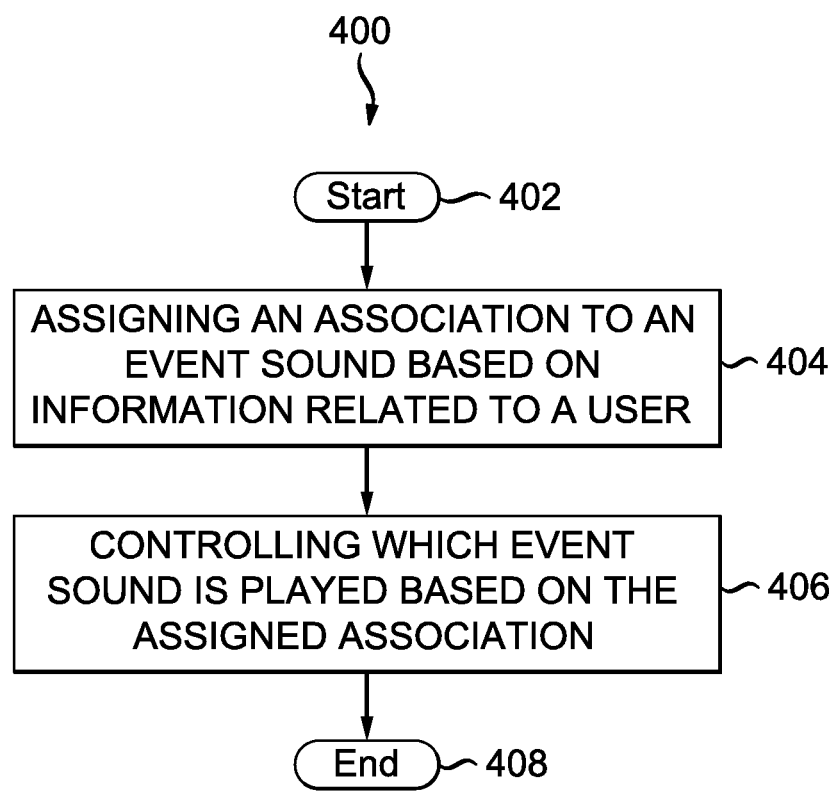
FIG. 4 is a flow diagram of a method of controlling event sounds for a multimedia system.

In view of the exemplary systems shown and described above, methodologies that can be implemented in accordance with the embodiments will be better appreciated with reference to the flow charts of FIG. 4. While, for purposes of simplicity of explanation, the methodologies are shown and described as a series of blocks, it is to be understood and appreciated that the embodiments are not limited by the order of the blocks, as some blocks can, in accordance with an embodiment, occur in different orders and/or concurrently with other blocks from that shown and described herein. Moreover, not all illustrated blocks may be required to implement the methodologies in accordance with the embodiments.

FIG. 4 is a flow diagram of a method 400 of controlling event sounds for a multimedia system. The method 400 starts 402 by assigning an association to an event sound based on information related to a user 404. The association can be a direct association/link to a given event sound and/or the association can have a weight value. For example, a direct link can have a weight value of 1.0 or 100% likelihood that a sound is associated with a given event. In a similar fashion, the weight value can be less than 1.0 to reflect a likelihood that a given user will like a sound to be associated to a given event. The weight value and/or association can be automatically updated/changed based on information such as, for example, a change in user preferences, a change in user and/or a change in multimedia systems and the like. The weight value can also be based on a type of media being consumed/selected and/or a content of the media being consumed/selected. Which event sound is played is then controlled based on the assigned association 406, ending the flow 408. Controlling which event sound is played can be based on multimedia system type and/or properties and the like as well as based on an environment in which the multimedia system is being used. For example, if the multimedia system is a mobile device and a user is watching media outdoors, a set of sounds based on animal sounds can be used. Likewise, if it is detected that the multimedia system is being used in a dark environment, a set of spooky sounds can be used. The sounds used can be default sounds and/or customized sounds. Some user may prefer a mixture of both. This can be determined explicitly and/or implicitly. In yet another scenario, control of when a sound is played can be based on a known future event such as the impending release of a movie and the like. This lets the user know that a release date is near. Likewise, if a visit with a relative is near, a sound set with sounds in the voice of the visiting person can be used. One skilled in the art can appreciate the many different combinations that can be provided with the above techniques.

What has been described above includes examples of the embodiments. It is, of course, not possible to describe every conceivable combination of components or methodologies for purposes of describing the embodiments, but one of ordinary skill in the art can recognize that many further combinations and permutations of the embodiments are possible. Accordingly, the subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. An apparatus comprising:
an associator configured to associate a plurality of sounds with an event
a controller configured to:
 detect an occurrence of the event; and
 select a sound from the plurality of sounds associated with the event based at least partially on a weight value corresponding to each of the sounds; and
wherein the controller is further configured to assign the weight value corresponding to each sound based at least partially on at least one of a preference of a user, user interface access, a user profile, a media selection, explicit user information and implicit user information.

2. The apparatus of claim 1, wherein the controller is further configured to alter the weight value corresponding to each sound based on a change in at least one of a preference of a user, a user interface access, a user profile, a media selection, explicit user information and implicit user information.

3. The apparatus of claim 2, wherein the weight value indicates a likelihood of selection by the controller.

4. The apparatus of claim 1, wherein the controller is further configured to select the sound based on an occurrence of an event and time.

5. A method comprising:
associating a plurality of sounds with an event; and
detecting an occurrence of the event; and
selecting a sound from the plurality of sounds associated with the event based at least partially on a weight value corresponding to each of the sounds; and
wherein the associating further comprises automatically changing the weight value when user information changes.

6. The method of claim 5, wherein the associating further comprises assigning the weight value corresponding to each sound based on at least one of media type selected and media content selected.

7. The method of claim 5 further comprising:
utilizing at least one of implicit information about a user and explicit information about a user, when assigning the weight value.

8. The method of claim 5, further comprising:
altering the weight value corresponding to each sound, when a different user is detected.

9. The method of claim 5, further comprising:
altering the weight value corresponding to each sound, when a different multimedia system is detected.

10. A system that controls event sounds in a multimedia system, comprising:
means for associating at least one sound to at least one event occurring in a multimedia system;
means for determining a probability for the associated sound based on a user; and
means for controlling which associated event sound occurs based on the probability.

11. The system of claim 10 further comprising:
means for dynamically changing a probability based on at least one of a change in multimedia system and a change in user.

* * * * *